United States Patent
Li et al.

(10) Patent No.: US 11,480,726 B2
(45) Date of Patent: Oct. 25, 2022

(54) FRAME-BACKPLATE ASSEMBLY, BACKLIGHT MODULE AND DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventors: Qilin Li, Beijing (CN); Qing Tian, Beijing (CN)

(73) Assignees: Beijing Boe Chatani Electronics Co., Ltd., Beijing (CN); Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/212,388

(22) Filed: Mar. 25, 2021

(65) Prior Publication Data
US 2022/0035095 A1 Feb. 3, 2022

(30) Foreign Application Priority Data
Jul. 30, 2020 (CN) .......................... 202010750293.0

(51) Int. Cl.
*G02F 1/1333* (2006.01)
*F21V 8/00* (2006.01)

(52) U.S. Cl.
CPC .......... *G02B 6/0088* (2013.01); *G02B 6/009* (2013.01); *G02F 1/133314* (2021.01); *G02F 1/133328* (2021.01); *G02F 2201/46* (2013.01)

(58) Field of Classification Search
None
See application file for complete search history.

(56) References Cited

U.S. PATENT DOCUMENTS

| | | | | |
|---|---|---|---|---|
| 2005/0151451 A1* | 7/2005 | Chen | ................. | G02F 1/133308 312/7.2 |
| 2011/0292315 A1* | 12/2011 | Bae | ................... | G02F 1/133308 362/606 |
| 2013/0057779 A1* | 3/2013 | Takata | ............... | G02F 1/133308 348/790 |
| 2015/0309366 A1* | 10/2015 | Park | .................. | G02F 1/133308 445/24 |

* cited by examiner

*Primary Examiner* — Richard H Kim
(74) *Attorney, Agent, or Firm* — Brooks Kushman P.C.

(57) ABSTRACT

A frame-backplate assembly, a backlight module and a display device are provided. The frame-backplate assembly includes a frame, including four side edges connected end to end in turn and enclosing a hollow frame structure, wherein each of the four side edges is adjustable in length; and a backplate located inside the hollow frame structure enclosed by the frame, wherein four side edges of the backplate are detachably connected with four sides in the frame.

18 Claims, 6 Drawing Sheets

FRAME-BACKPLATE ASSEMBLY, BACKLIGHT MODULE AND DISPLAY DEVICE

CROSS-REFERENCE TO RELATED APPLICATION

This application claims priority to Chinese Patent Application No. 202010750293.0 filed on Jul. 30, 2020, which is incorporated herein by reference in its entirety.

TECHNICAL FIELD

The present disclosure relates to the field of display technologies, and in particular, relates to a frame-backplate assembly, a backlight module and a display device.

BACKGROUND

With application and development of a liquid crystal display (LCD), more and more types of products are produced. In order to meet requirements of products in various works of life, display modules in different sizes are also gradually produced. In spite of a small overall demand for display module of different sizes, a development cycle of products that meet needs of various works of life is the same as that of products with a large batch size, and a focus thereof is on a frame and a backplate of a display module. It usually takes at least 15 days from a design of the frame and the backplate to mold-making of a first version for the frame and the backplate, and debugging also needs to be made later. In order to reduce a corresponding development cycle of such special-sized display module, reduce a mold-making cost and increase a revenue, it is particularly important to use a general-purpose frame and a general-purpose backplate.

SUMMARY

The present disclosure provides a frame-backplate assembly, a backlight module and a display device.

The present disclosure provides a frame-backplate assembly. The frame-backplate assembly includes a frame, including four side edges connected end to end in turn and enclosing a hollow frame structure, wherein each of the four side edges is adjustable in length; and a backplate located inside the hollow frame structure enclosed by the frame, wherein four side edges of the backplate are detachably connected with four sides in the frame.

Optionally, the frame includes: two first frame straight-edge parts opposite to each other; two second frame straight-edge parts opposite to each other; and four frame corner parts, each of the frame corner parts including a first portion and a second portion disposed at an included angle; wherein each frame corner part of the four frame corner parts is connected to one first frame straight-edge part and one second frame straight-edge part adjacent to the one first frame straight-edge part, and the first portion of the frame corner part is butted with the one first frame straight-edge part, and the second portion of the frame corner part is butted with the one second frame straight-edge part, the four side edges of the frame are composed of the four frame corner parts, two first frame straight-edge part, and two second frame straight-edge parts.

Optionally, the first frame straight-edge part is detachably or slideably connected with the first portion; and/or the second frame straight-edge part is detachably connected or slideably connected with the second portion.

Optionally, the backplate includes: a backplate body inside the hollow frame structure enclosed by the frame and having four side edges, wherein the four side edges of the backplate body are detachably connected with the four side edges of the frame; and an adjustable bracket detachably connected with the backplate body, wherein a length of projection, on each of the four side edges of the frame, of the adjustable bracket is adjustable.

Optionally, the adjustable bracket includes one or more cross-rod linkage mechanisms, each of the one or more cross-rod linkage mechanisms includes at least two scalable connection rods, middle portions of the at least two scalable connection rods are rotatably pivoted together, each scalable connection rod of the at least two scalable connection rods is extendable and retractable so as to adjust a length of the scalable connection rod; two opposite ends of one scalable connection rod of the at least two scalable connection rods are rotatably connected with a pair of diagonally positioned corners of the backplate body, respectively; two opposite ends of another scalable connection rod of the at least two scalable connection rods are rotatably connected with another pair of diagonally positioned corners of the backplate body, respectively.

Optionally, each scalable connection rod of the at least two scalable connection rods includes: a middle rod, including a first end and a second end opposite to the first end, a middle portion of the middle rod being provided with a pivot hole; a first end rod, wherein a first end of the first end rod is slideably connected with the first end of the middle rod and is slideable relative to the middle rod, a second end of the first end rod is rotatably connected with one corner of a pair of diagonally positioned corners of the backplate body; and a second end rod, wherein a first end of the second end rod is slideably connected with the second end of the middle rod and is slideable relative to the middle rod, a second end of the second end rod is connected with other corner of the pair of diagonally positioned corners of the backplate body; wherein, the at least two scalable connection rods in each of the one or more cross-rod linkage mechanisms are pivotally connected by a rotating shaft inserted in a pivot hole on the middle rod of each scalable connection rod of the at least two scalable connection rods.

Optionally, the middle rod is a rod-shaped structure; each of the first end rod and the second end rod is a hollow sectional bar structure with a hollow cavity; a first end of the middle rod is inserted into the hollow cavity of the first end rod and is slideable within the hollow cavity; a second end of the middle rod is inserted into the hollow cavity of the second end rod and is slideable within the hollow cavity.

Optionally, the backplate body includes: four corner backplates at four corner locations of the backplate body, each of the four corner backplates including a corner side plate portion and a corner bottom plate portion.

Optionally, the backplate body further includes a middle backplate arranged among the four corner backplates, wherein the middle backplate includes a middle side plate portion and a middle bottom plate portion, the middle side plate portion includes a first middle side plate sub-portion corresponding to the first frame straight-edge part, and a second middle side plate sub-portion corresponding to the second frame straight-edge part, a butting position between the corner side plate portion and the first middle side plate sub-portion, and a butting position between a corresponding frame corner part and a corresponding first frame straight-edge part are staggered; a butting position between the corner side plate portion and the second middle side plate sub-portion, and a butting position between a corresponding frame corner part and a corresponding second frame straight-edge part are staggered.

Optionally, the corner side plate portion is provided with a first connection hole at one end, butted with the first middle side plate sub-portion, of the corner side plate portion; the first middle side plate sub-portion is provided with a second connection hole and a third connection hole at one end, butted with the corner side plate portion, the first middle side plate sub-portion; the frame corner part is provided with a fourth connection hole and a fifth connection hole at one end, butted with the first frame straight-edge part, of the frame corner part; the first frame straight-edge part is provided with a sixth connection hole at one end, butted with frame corner part, of the first frame straight-edge part; a first bolt is inserted into the first connection hole and the fourth connection hole, a second bolt is inserted into the second connection hole and the fifth connection hole, a third bolt is inserted into the third connection hole and the sixth connection hole; the corner side plate portion is provided with a seventh connection hole at one end, butted with the second middle side plate sub-portion, of the corner side plate portion; the second middle side plate sub-portion is provided with an eighth connection hole and a ninth connection hole at one end, butted with the corner side plate portion, of the second middle side plate sub-portion; the frame corner part is provided with a tenth connection hole and an eleventh connection hole at one end, butted with the second frame straight-edge part, of the frame corner part; the second frame straight-edge part is provided with a twelfth connection hole at one end, butted with the frame corner part, of the second frame straight-edge part; a fourth bolt is inserted into the seventh connection hole and the tenth connection hole, a fifth bolt is inserted into the eighth connection hole and the eleventh connection hole, and a sixth bolt is inserted into the ninth connection hole and the twelfth connection hole.

Optionally, two opposite ends of one scalable connection rod of the at least two scalable connection rods are respectively rotatably connected with corner bottom plate portions of a pair of diagonally positioned corner backplates among the four corner backplates; two opposite ends of another scalable connection rod of the at least two scalable connection rods are respectively rotatably connected with corner bottom plate portions of another pair of diagonally positioned corner backplates among the four corner backplates.

Optionally, the adjustable bracket includes at least two cross-rod linkage mechanisms; two scalable connection rods, connected to a same pair of diagonally positioned corner backplates among the four frame corner parts, of two cross-rod linkage mechanisms are arranged in parallel.

Optionally, the four corner backplates include a first corner backplate and a second corner backplate, a third corner backplate, and a fourth corner backplate, wherein the first corner backplate and the third corner backplate are diagonally positioned, and the second corner backplate and the fourth corner backplate are diagonally positioned; each of the corner bottom plate portions includes a first plate sub-portion and a second plate sub-portion disposed at an included angle; the first plate sub-portion is connected with the first portion of the frame corner part, the second plate sub-portion is connected with the second portion of the frame corner part; the at least two cross-rod linkage mechanisms include a first cross-rod linkage mechanism and a second cross-rod linkage mechanism; the two scalable connection rods of each of the first cross-rod linkage mechanism and the second cross-rod linkage mechanism include a first scalable connection rod and a second scalable connection rod; the first scalable connection rod of the first cross-rod linkage mechanism is parallel to the first scalable connection rod of the second cross-rod linkage mechanism; a first end of the first scalable connection rod of the first cross-rod linkage mechanism is connected with the first plate sub-portion of the corner bottom plate portion of the first corner backplate, and a second end of the first scalable connection rod of the first cross-rod linkage mechanism is connected with the second plate sub-portion of the corner bottom plate portion of the third corner backplate; a first end of the first scalable connection rod of the second cross-rod linkage mechanism is connected with the second plate sub-portion of the corner bottom plate portion of the first corner backplate, and a second end of the first scalable connection rod of the second cross-rod linkage mechanism is connected with the first plate sub-portion of the corner bottom plate portion of the third corner backplate; the second scalable connection rod of the first cross-rod linkage mechanism is parallel to the second scalable connection rod of the second cross-rod linkage mechanism; a first end of the second scalable connection rod of the first cross-rod linkage mechanism is connected with the first plate sub-portion of the corner bottom plate portion of the second corner backplate, and a second end of the second scalable connection rod of the first cross-rod linkage mechanism is connected with the second plate sub-portion of the corner bottom plate portion of the fourth corner backplate; a first end of the second scalable connection rod of the second cross-rod linkage mechanism is connected with the second plate sub-portion of the corner bottom plate portion of the second corner backplate, and a second end of the second scalable connection rod of the second cross-rod linkage mechanism is connected with the first plate sub-portion of the corner bottom plate portion of the fourth corner backplate.

Optionally, each of the one or more cross-rod linkage mechanisms is further provided with a pre-locking structure at a pivot where the at least two scalable connection rods are pivotally connected; the pre-locking structure is used for defining an angle of relative rotation between the at least two scalable connection rods.

Optionally, each scalable connection rod of the at least two scalable connection rods is further provided with a length retaining structure for retain a scalable degree of the scalable connection rod.

Optionally, the length retaining structure includes: one or more resilient buttons arranged on the middle rod; and at least one row of holes arranged sequentially in a lengthwise direction of the scalable connection rod at end portions, for connecting the middle rod, of the first end rod and the second end rod; wherein the resilient button is configured to spring into a corresponding hole of the at least one row of holes, such that relative positions between the first end rod and the middle rod and between the second end rod and the middle rod are retained.

Optionally, the frame-backplate assembly further includes: a thin baseplate supported by the adjustable bracket and stacked on the backplate body.

Optionally, a hollow cavity for accommodating a light bar is provided inside at least one side edge of the frame, and an open for a lead terminal of the light rod is arranged at the side edge.

The present disclosure further provides a backlight module. The backlight module includes the frame-backplate assembly provided above; a reflective sheet in the frame and at a side, away from the adjustable bracket, of the thin baseplate; a light guide plate at a side, away from the thin baseplate, of the reflective sheet; an optical film on a side, away from the thin baseplate, of the light guide plate; and a light bar, wherein, a hollow cavity for accommodating the light bar is provided inside at least one side edge of the frame, and the light bar is in the hollow cavity.

The present disclosure further provides a display device. The display device includes the backlight module provided above; a display panel, wherein the frame supports the display panel; and a buffer layer between the frame and the display panel.

DETAILED DESCRIPTION

Figure 1:
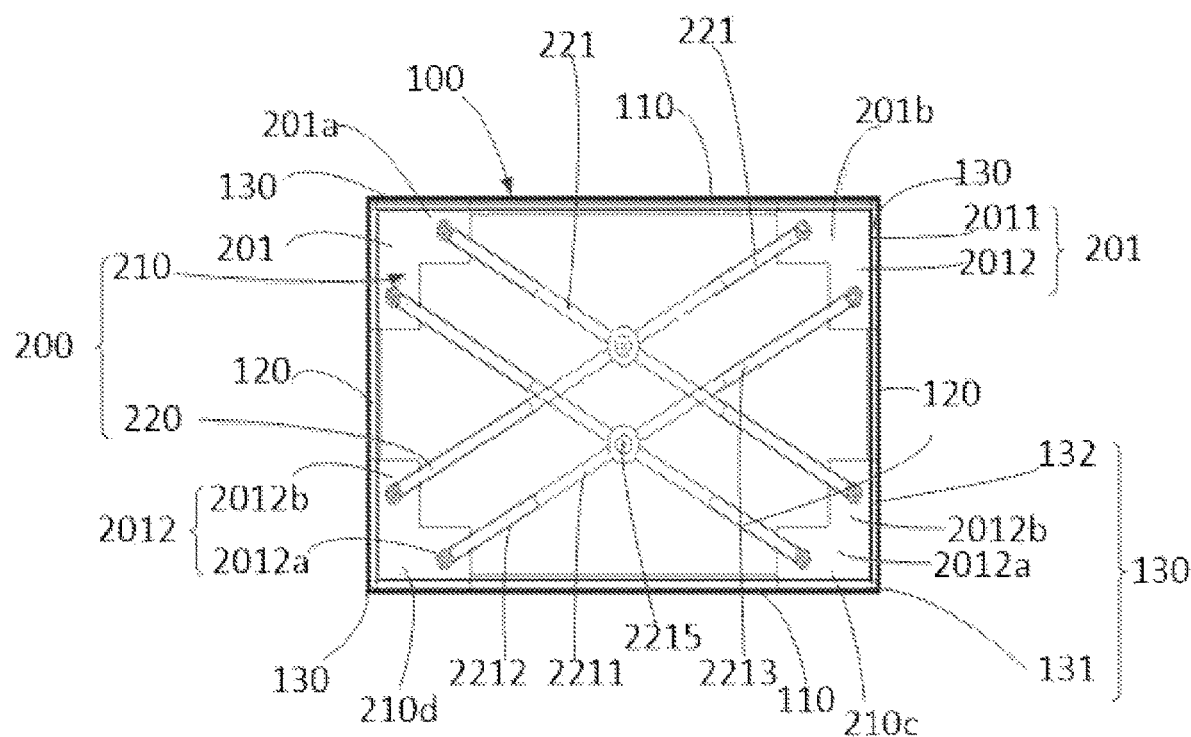
FIG. 1 is a front view of a frame-backplate assembly provided by the present disclosure.

In order to make objectives, technical solutions and advantages of the embodiments of the present disclosure more clear, the technical solutions of the embodiments of the present disclosure will be described clearly and completely hereinafter in conjunction with the drawings and the embodiments of the present disclosure. It will be apparent that the described embodiments are part, rather than all, of the embodiments of the present disclosure. Based on the described embodiments of the present disclosure, all other embodiments obtained by those of ordinary skill in the art are within the protection scope of the present disclosure.

In the description of the present disclosure, it should be noted that, an orientation relation or a positional relation indicated by such terms as "center", "upper", "lower", "left", "right", "vertical", "horizontal", "inner", and "outer" indicate is based on an orientation relation or a positional relation shown in the drawings, and is merely used to facilitate description of the present disclosure and to simplify the description, rather than to indicate or imply that devices or elements indicated in this way must have a particular orientation, be arranged in a particular orientation or be operated in a specific orientation, and therefore is not to be construed as a limit to disclosure. In addition, such terms as "first", "second", and "third" are used for a descriptive purpose only and are not to be construed as indicating or implying relative importance.

Figure 2:
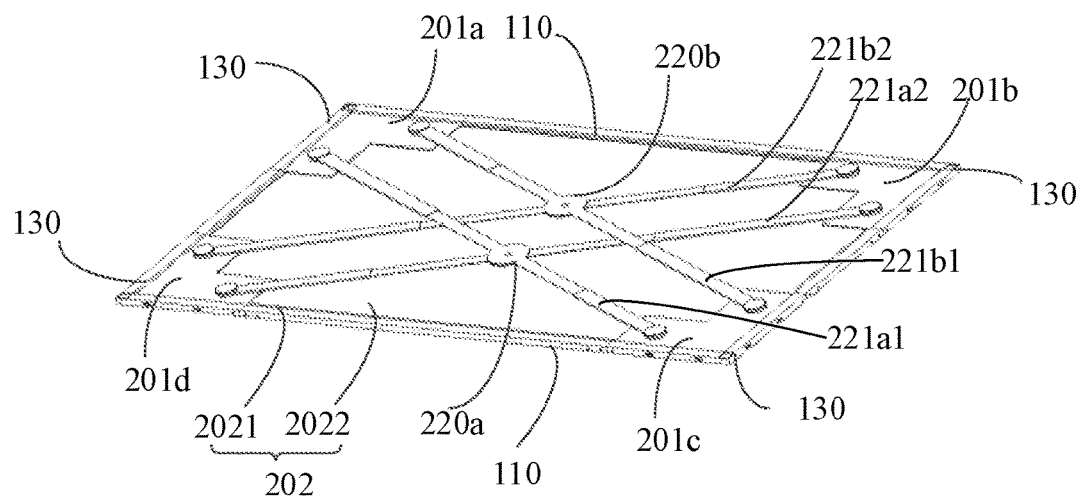
FIG. 2 is a perspective view of a frame-backplate assembly provided by the present disclosure.

In the embodiments of the present disclosure, a frame-backplate assembly, a backlight module and a display device are provided, which can solve the technical problem in the related art that a general-purpose backplate and a general-purpose frame do not exist, resulting in that display modules in different sizes require individual mold-making, and a cost for debugging and mold-making is high and a development cycle thereof is long, and a cost of mold-making of display modules of different sizes can be greatly reduced, and the frame-backplate assembly can also be used for early development and test, reduce a mold-making cycle, shorten an overall project schedule As shown in FIG. 1 and FIG. 2, the frame-backplate assembly provided by the embodiments of the present disclosure includes a frame 100 and a backplate 200.

The frame 100 includes four side edges connected end to end in turn and enclosing a hollow frame structure, each of the four side edges is adjustable in length.

The backplate 200 is located inside the hollow frame structure enclosed by the frame, wherein four side edges of the backplate are detachably connected with four side edges in the frame.

In the above solution, the frame-backplate assembly provided by the embodiments of the present disclosure is mainly applied to a backlight module of a display device, and the frame-backplate assembly includes two main parts i.e., the frame 100 and the backboard 200, here, the length of each side edges of the frame 100 can be adjusted, that is, lengths of long and short side edges of the frame 100 are adjustable, and the backplate 200 can be detachably connected to the frame 100. Backplates of different sizes can replace the backplate 200. In this way, the frame-backplate assembly can be applied to modules of different sizes, and can be used as a general-purpose frame 100 and a general-purpose backplate 200, which are suitable for usage in display modules of various sizes. In particular, for the modules with a smaller batch, a cost of mold-making may be greatly reduced, and the frame-backplate assembly may also be used for the early development and test, reduce the mold-making cycle, and shorten the overall project schedule.

The frame-backplate assembly provided by the embodiments of the present disclosure are described in more detail below.

Figure 8:
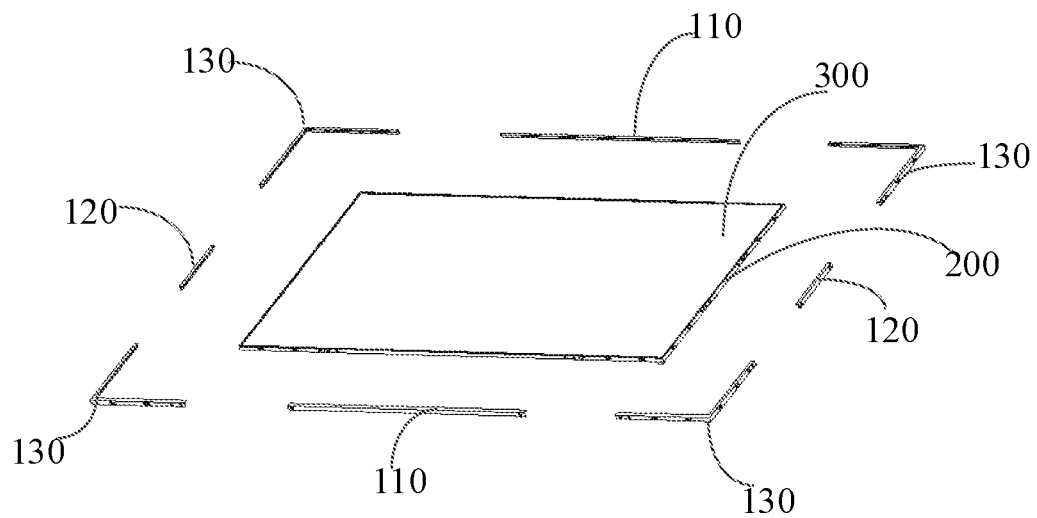
FIG. 8 is an exploded view of a frame-backplate assembly provided by the present disclosure.

In some exemplary embodiments, as shown in FIGS. 1-2 and 8, the frame 100 includes two first frame straight-edge parts 110 arranged opposite to each other, two second frame straight-edge parts 120 arranged opposite to each other, and four frame corner parts 130. Each of the frame corner parts 130 includes a first portion 131 and a second portion 132 disposed at an angle, wherein one frame corner part 130 is connected to the first frame straight-edge part 110 and the second frame straight-edge part 120 adjacent to each other. The first portion 131 of the frame corner part 130 is butted with the first frame straight-edge part 110, and the second portion 132 of the frame corner part is butted with the second frame straight-edge part 120. The four side edges of the frame are composed of four frame corner parts 130, two first frame straight-edge parts 110, and two second frame straight-edge parts 120. That is, each of the two first frame straight-edge parts 110 is joined to first portions 131 of two frame corner parts connected to the first frame straight-edge part, to form a first side edge of the frame, and each of the two second frame straight-edge parts 120 is joined to second portions 132 of two frame corner parts connected to the second frame straight-edge part to form a second side edge of the frame.

In the above embodiment, the frame 100 includes four frame corner parts 130 and four frame straight-edge parts connected to each other, to form a hollow frame structure, wherein the first portion 131 and the second portion 132 of the frame corner part 130 are arranged at an angle, which may mean that the first portion 131 and the second portion 132 are perpendicular to each other. Of course, it will be understood that a specific structure of the frame 100 is not limited thereto. In addition, in each of the frame corner parts, the lengths of the first portion 131 and the second portion 132 may be the same or may be different.

It should be noted that perpendicularity in the embodiments of the present disclosure not only means an included angle of 90 degrees, but also mean that an included angle between the first portion and the second portion may be within a certain error range, that is, within a range of $90°\pm\alpha°$ ($0\leq\alpha\leq10°$). For example, the included angle is within the range of $90°\pm5°$, $90\pm10°$, etc.

It should also be noted that parallelism in the embodiments of the present disclosure not only means that the included angle therebetween is 0°, but also mean that the included angle between the first portion and the second portion to be within a certain error range, for example, the included angle is within $0°\pm\alpha°$ ($0\leq\alpha\leq10°$). For example, the included angle is within the range of $0°\pm5°$, $0\pm10°$, etc.

In some exemplary embodiments, the first frame straight-edge part 110 is detachably connected to the first portion 131, and the second frame straight-edge part 120 is detachably connected to the second portion 132, for example, the first frame straight-edge part 110 is connected to the first portion 131 by means of a bolt, and the second frame straight-edge part 120 is connected to the second portion 132 by means of a bolt. By replacing the first frame straight-edge part 110 with a first frame straight-edge part 110 having a different length and replacing the second frame straight-edge part 120 with a second frame straight-edge part having a different size, lengths of a long side edge and a short side edge of the frame 100 can be adjusted, and a structure of the frame is simple and can be operated easily.

Figure 3:
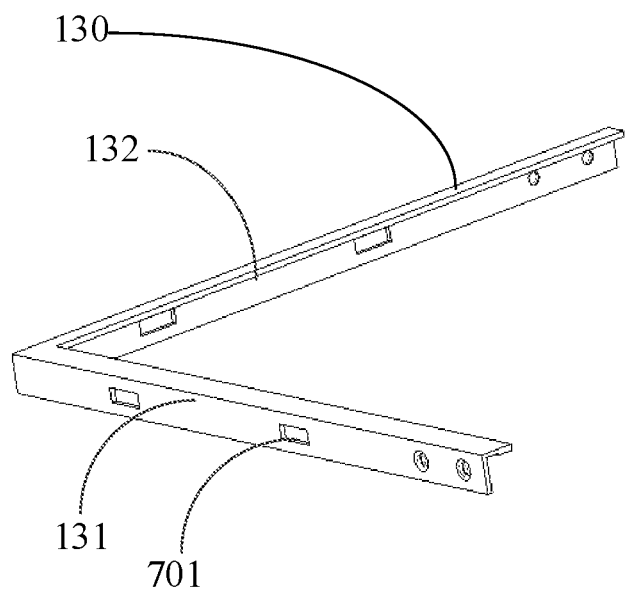
FIG. 3 is a schematic structural diagram of a frame corner part of a frame in a frame-backplate assembly provided by the present disclosure.
Figure 5:
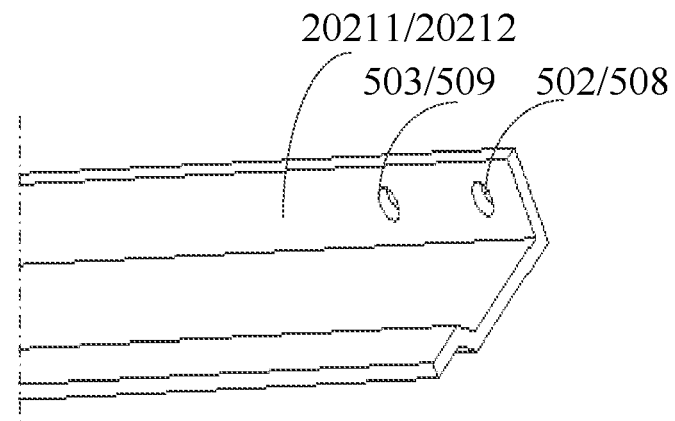
FIG. 5 is a schematic structural diagram of a frame straight-edge part of a frame in a frame-backplate assembly provided by the present disclosure.

As shown in FIG. 3 and FIG. 5, the frame corner parts 130, the first frame straight-edge parts 110 and the second frame straight-edge parts 120 are all made of section bars. The lengths of the first frame straight-edge part 110 and the second frame straight-edge part 120 can be cut according to requirements, and screw holes can be respectively made at both ends of each of the first frame straight-edge part 110 and the second frame straight-edge part 120.

Of course, it will be understood that only one type of detachable connection between the first frame straight-edge part 110 and the first portion 131 is provided above, and one type of detachable connection between the second frame straight-edge part 120 and the second part 132, that is, the detachable connections are by means of screws. However, in practice, the types of detachable connections between the first frame straight-edge part 110 and the first portion 131, and between the second frame straight-edge part 120 and the second portion 132 are not limited thereto. For example, a snap connection or the like may also be used, and a detailed description of the snap connection is not provided herein.

In addition, in the embodiment disclosed above, the detachable connections are used for connecting the frame corner part 130 to the first frame straight-edge part 110, and connecting the frame corner part 130 to the second frame straight-edge part 120. Adjustment of the lengths of the side edges of the frame 100 is realized by replacing frame straight-edge parts of different sizes.

In other embodiments, sliding connection is adopted between the frame corner part 130 and the first frame straight-edge part 110, and slide connection is used between the frame corner part 130 and the second frame straight-edge part 120. In this way, the frame corner part 130 may slide with respect to the first frame straight-edge part 110 in a lengthwise direction of the first straight-edge frame 110, the frame corner part 130 may slide with respect to the second frame straight-edge part 120 in a lengthwise direction of the second frame straight-edge part 120, so as to adjust the length of each side edge of the frame 100.

For example, an end portion of the first frame straight-edge part 110 has a hollow structure, and the frame corner part 130 is a plate-shaped sectional bar structure. By inserting the frame corner part 130 into the hollow structure of the end portion of the first frame straight-edge part, relative sliding between the frame corner part 130 and the first frame straight-edge part 110 is achieved. In such a case, a first position-retaining structure may be further provided between the first frame straight-edge part 110 and the frame corner part 130, so as to configure a relative position between the first frame straight-edge part 110 and the frame corner part 130, thereby configure the length of a respective side edge of the frame 100. Likewise, an end portion of the second frame straight-edge part 120 has a hollow structure, the frame corner part 130 is a plate-shaped sectional bar structure; by inserting the frame corner part 130 into the hollow structure of the end portion of the second frame straight-edge part 120, relative sliding between the frame corner part 130 and the second frame straight-edge part 120 is achieved. In this case, a second position-retaining structure may be further disposed between the second frame straight-edge part 120 and the frame corner part 130, so as to retain a relative position between the second frame straight-edge part 120 and the frame corner part 130, thereby configuring a length of a respective side edge of the frame 100. The first position-retaining structure and the second position-retaining structure may be the same or different. Each of the first position-retaining structure and the second position-retaining structure may continuously or stepwise retain the relative position between the first frame straight-edge part 110 and the frame corner part 130 or retain the relative position between the second frame straight-edge part 120 and the frame corner part 130 by various position-retaining structures. These position-retaining structures may be a spring retainer, a snap retainer or the like.

It should be noted that the detachable connections between the frame corner part 130 and the first frame straight-edge part 110, and between the frame corner part 130 and the second frame straight-edge part 120 is simpler in structure and more convenient to be operated, as compared with the sliding connections between the frame corner part 130 and the first frame straight-edge part 110, and between the frame corner part 130 and the second frame straight-edge part 120.

In some exemplary embodiments of the present disclosure, as shown in FIG. 1 and FIG. 2, the backplate 200 includes a backplate body 210 and an adjustable bracket 220. The backplate body 210 is detachably connected to the frame, and the adjustable bracket 220 is detachably connected to the backplate body 210, and a length of a projection of the adjustable bracket 220 on each side edge of the frame 100 is adjustable.

In the embodiment disclosed above, the adjustable bracket 220 is arranged on the backplate 200, which can play a role of supporting the backplate body 210 and acting as a support baseplate for a backlight module, and the length of the projection of the adjustable bracket 220 on each side edge of the frame 100 is adjustable, that is, the adjustable bracket 220 can be changed with changes of lengths of long and short side edges of the frame 100.

In some exemplary embodiments, as shown in FIGS. 1 and 2, the adjustable bracket 220 includes at least one cross-rod linkage mechanism, two cross-rod linkage mechanisms are shown in FIG. 1 and FIG. 2. Each of the cross-rod linkage mechanisms includes at least two scalable connection rods 221, middle portions of the at least two scalable connection rods 221 are pivotally connected together by means of a pivot axis and can rotate relative to each other around the pivot axis. Each of the scalable connection rods 221 is extendable and retractable, to adjust the length of the scalable connection rod 221.

Two opposite ends of one of the at least two scalable connection rods 221 are connected with a pair of diagonally positioned corners of the backplate body 210, respectively. Two opposite ends of the other of the at least two scalable connection rods 221 are connected to the other pair of diagonally positioned corners of the backplate body 210.

In the embodiment disclosed above, the adjustable bracket 220 is made of at least one cross-rod linkage mechanism. At least two scalable connection rods 221 in each cross-rod linkage mechanism intersect to form a cross shape. Four ends of the two scalable connection rods are respectively connected to the backplate body 210 near four corner positions of the backplate body 210, and the middle portions of two scalable connection rods are pivotally connected and relatively rotatable with respect to each other. In this way, by adjusting an angle of relative rotation between the two scalable connection rods 221 and adjusting the length of each scalable connection rod 221, adjustment of lengths of the adjustable bracket 220 in a lengthwise direction of the first frame straight-edge part 110 and a lengthwise direction of the second frame straight-edge part 120 may be performed, i.e., the purpose of adjusting the length of projection of the adjustable bracket 220 in the lengthwise direction of each of the side edges of the frame is achieved.

The size of the frame 100 is adjusted by replacing the first frame straight-edge part 110 having a corresponding length and replacing the second frame straight-edge part 120 having a corresponding length, and at the same time, the angle of relative rotation between the two scalable connection rods 221 in the cross-rod linkage mechanism and the length of each scalable connection rod 221 can be adjusted, so that the frame-backplate assembly are suitable for modules of different sizes.

It should be noted that the cross-rod linkage mechanism may include only two scalable connection rods 221, or may include more than two scalable connection rods 221. Ends of at least two of the two or more scalable connection rods 221 are connected to the backplate body at positions adjacent to four corner positions of the backplate body, and ends of other scalable connection rods 221 may be connected to the backplate body at positions adjacent to corner positions of the backplate body, or may also be connected to the backplate body at other portions of the backplate body.

It should also be noted that in the above embodiment, the adjustable bracket 220 adopts a cross-rod linkage mechanism, and the cross-rod linkage mechanism is connected with a frame matching the cross-rod linkage mechanism, after the angle of relative rotation between the two scalable connection rods 221 is fixed and the relative rotation between the two scalable connection rods 221 is pre-tensioned and locked. The cross-rod linkage mechanism may make connection with the backplate body 210 more stable, and the specific number of the cross-rod linkage mechanisms may be one, or two or more than two.

It should be understood that, in practical application, the adjustable bracket 220 can also be realized by other bracket structures, for example, multiple parallel scalable rods can be used for the adjustable bracket 220.

Figure 6:
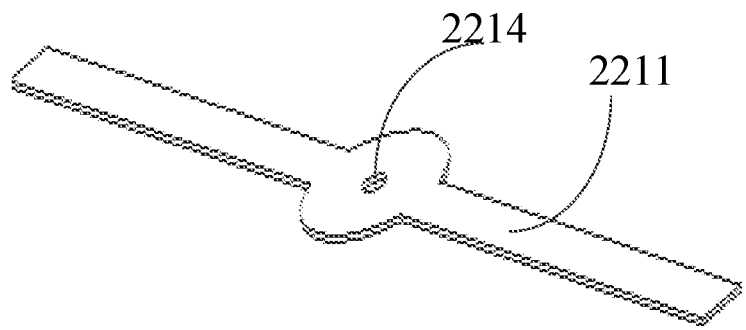
FIG. 6 is a schematic structural view of a middle rod in a frame-backplate assembly provided by the present disclosure.
Figure 7:
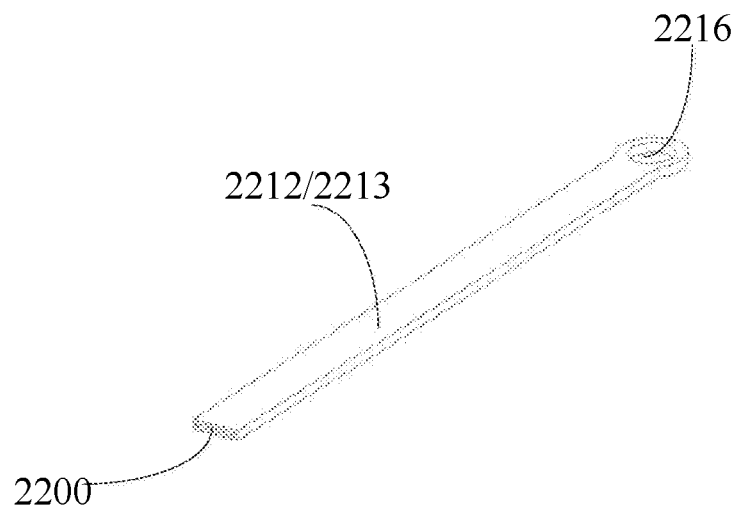
FIG. 7 is a schematic structural view of a first end rod or a second end rod in a frame-backplate assembly provided by the present disclosure.

Further, in some exemplary embodiments provided by the present disclosure, as shown in FIGS. 1, 6, and 7, each of the scalable connection rods 221 includes a middle rod 2211, a first end rod 2212, and a second end rod 2213. The middle rod 2211 includes a first end and a second end opposite to the first end, and a pivot hole 2214 is provided in the middle of the middle rod 2211. One end of the first middle rod 2211 is connected to a first end of the middle rod 2211 in a slideable manner, and may slide with respect to the middle rod 2211; the other end of the first end rod 2212 is connected to the frame 100. One end of the second end rod 2213 is connected to a second end of the middle rod 2211 in a slideable manner, and may slide with respect to the middle rod 2211; the other end of the second end rod 2213 is connected to the frame 100, wherein at least two scalable connection rods 221 in the cross-rod linkage mechanism are pivotally connected by means of a rotating shaft 2215 inserted into the pivot hole 2214 in the middle rod 2211 of the scalable connection rod 221.

In a specific exemplary embodiment, as shown in FIG. 5 and FIG. 7, the middle rod 2211 has a rod-shaped structure, the first end rod 2212 and the second end rod 2213 have a hollow sectional bar structure with a hollow cavity 2200. The first end of the middle rod 2211 may be inserted into the hollow cavity 2200 of the first end rod 2212, and may slide within the hollow cavity 2200; the second end of the middle rod 2211 is inserted into the hollow cavity 2200 of the second end rod 2213, and may slide within the hollow cavity 2200.

In the above embodiment, the middle rod 2211 of the scalable connection rod 221 can be punched from a plate without making a mold, therefore is easy to be formed. In addition, the first end rod 2212 and the second end rod 2213 can be cut from a specific square steel. Ends, for connecting with the middle rod 2211, of the first end rod 2212 and the second end rod 2213 have hollow cavities, so as to cover the end of the middle rod 2211 to achieve the purpose of relative sliding. The other ends of the first end rod 2212 and the second end rod 2213 can be crushed to form a ring 2216 used as connecting holes for connection with the frame 100.

Of course, it can be understood that, in practical application, the specific structure of the scalable connection rod 221 is not limited to the above, as long as the two scalable connection rods 221 can be pivotally connected in the middle of the two scalable connection rods 221. In addition, any structure extendable and retractable for adjusting a length, which is used for the scalable connection rod 221, is within the protection scope of the present disclosure, and are not described in detail herein.

In addition, in some exemplary embodiments of the present disclosure, as shown in FIGS. 1 and 2, the backplate body 210 includes four corner backplates 201 at four corner locations of the backplate body. Four corner backplates 201a, 201b, 201c and 201d are shown in FIG. 1 and FIG. 2.

Each of the corner backplates 201 includes a corner side plate portion 2011 and a corner bottom plate portion 2012. As shown in FIG. 1, two opposite ends of one of the two scalable connection rods 221 are respectively connected to a pair of corner backplates 201 located at diagonal positions of the backplate body, and two opposite ends of the other of the two scalable connection rods 221 are respectively connected to the other pair of corner backplates 201 located at other diagonal positions of the backplate body.

It should be noted that, in some embodiments, as shown in FIG. 1, an area between the four corner backplates 201 is a hollowed-out area, and the four corners backplate 201 are connected by the cross-rod linkage mechanisms.

In some embodiments, as shown in FIG. 2, the backplate body further includes a middle backplate 202 arranged among the four corner backplates 201. The middle backplate 202 is shaped as an irregular shaped form by cutting four corners, having the same shape as those of the four corner backplates, of a rectangular backplate. The middle backplate 202 includes a middle side plate portion 2021 and a middle bottom plate portion 2022, wherein one corner side plate portion 2011 is butted with a middle side plate portion 2021 to form a side plate portion of the backplate body. The corner bottom plate portions 2012 are butted with the middle bottom plate portion 2022 to form a bottom plate portion of the backplate body 210.

In the above technical solution, the backplate body 210 includes four corner backplates 201 and the middle backplate 202, wherein the ends of the two scalable connection rods 221 in the cross-rod linkage mechanism can be connected to the corner backplates 201, so that, when the frame-backplate assembly is applicable to different sizes of modules, only the angle of relative rotation of the scalable connection rods in the cross-rod linkage mechanism and lengths of the scalable connection rods can be adjusted, and only the middle backplate 202 having a necessary size needs to be replaced.

In addition, in some exemplary embodiments, the middle side plate portion 2021 includes a first middle side plate sub-portion 20211 corresponding to the first frame straight-edge part 110, and a second middle side plate sub-portion 20212 corresponding to the second frame straight-edge part 120. A butting position between a corner side plate portion 2011 and the first middle side plate sub-portion 20211, and a butting position between a corresponding frame corner part 130 and a corresponding first frame straight-edge part 110 are staggered. A butting position between the corner side plate portion 2011 and the second middle side plate sub-portion 20212, and a butting position between a corresponding frame corner part 130 and a corresponding second frame straight-edge part 120 are staggered. The staggering here means that two butting positions lie in different planes perpendicular to the frame corner part. For example, staggering of the butting position between the corner side plate portion 2011 and the second middle side plate sub-portion 20212 with the butting position between the corresponding frame corner part 130 and the second frame straight-edge part 120, means that a plane in which the butting position between the corner side plate portion 2011 and the second middle side plate sub-portion 20212 is located is parallel to and spaced apart from a plane in which the butting position between the corresponding frame corner part 130 and the second frame straight-edge part 120 is located.

In the above exemplary embodiment, connection between the backplate 200 and the frame 100 is in such a way that an outer side surface of a side plate portion of the backplate body 210 is closed attached to an inner side surface of the frame. The backplate body 210 is formed by splicing the corner backplates 201 with the middle backplate 202, and the frame 100 is formed by splicing the frame corner part 130, the first frame straight-edge parts 110, and the second frame straight-edge parts 120. Side plate portions of the backplate body 210 are formed by butting the corner side plate portion 2011 of the corner backplate 201 against the middle side plate portions 2021 of the middle backplate 202, and side edges of the frame 100 are formed by butting the frame corner parts 130 against both the first frame straight-edge part 110 and the second frame straight-edge part 120. Therefore, in order to ensure stability of an overall structure of the assembly, the butting position between the corner side plate portion 2011 and the first middle side plate sub-portion 20211, and the butting position between the frame corner part 130 and the first frame straight-edge part 110 are staggered; and the butting position between the corner side plate portion 2011 and the second middle side plate sub-portion 20212, and the butting position between the frame corner part 130 and the second frame straight-edge part 120 are also staggered, so as to ensure a strength near the butting positions.

Figure 4:
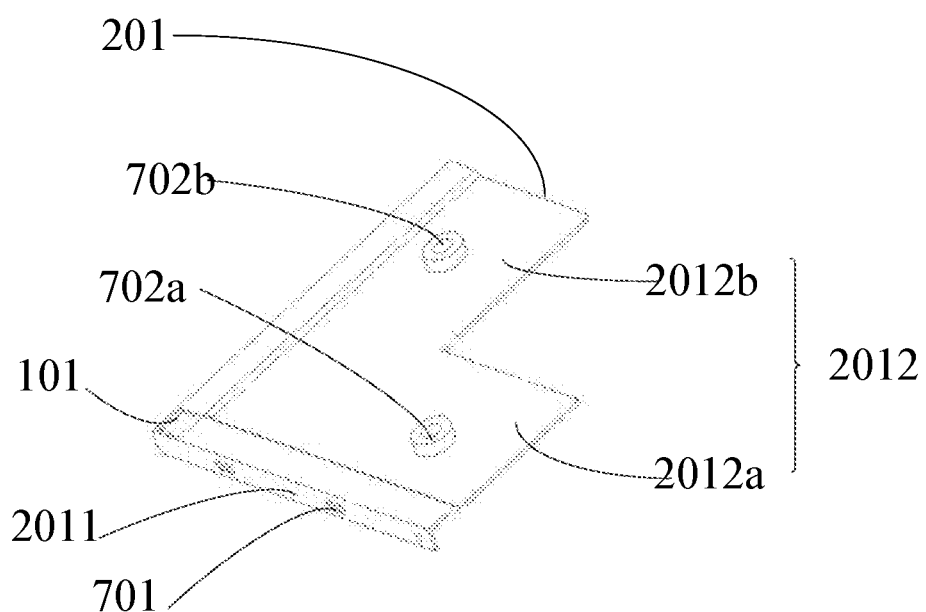
FIG. 4 is a schematic structural diagram of a frame corner part of a backplate in a frame-backplate assembly provided by the present disclosure.
Figure 9A:
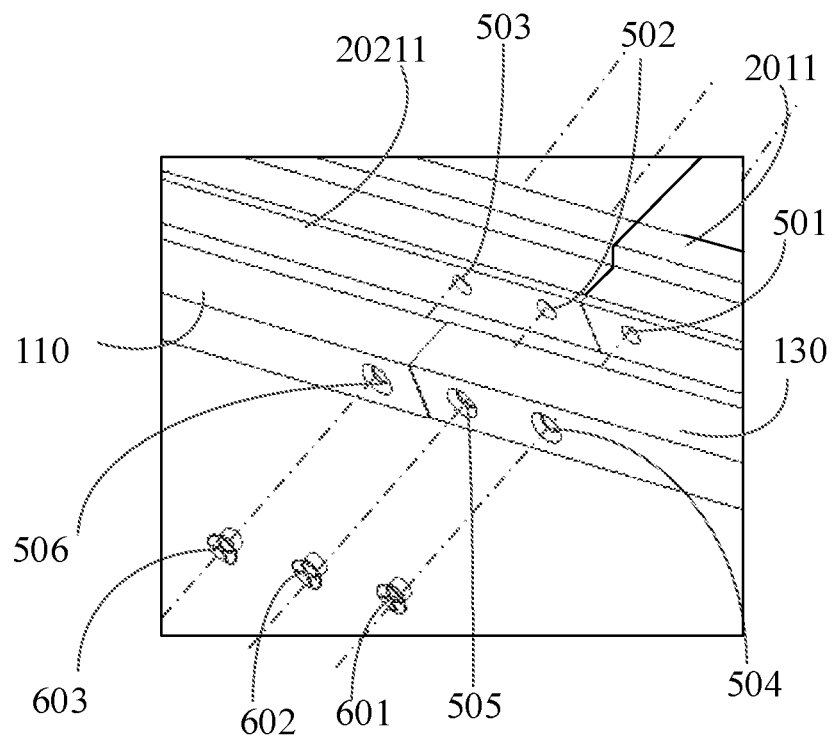
FIGS. 9A and 9B are partial schematic views of detachable connection structures between a frame and a backplate in a frame-backplate assembly provided by the present disclosure.

In addition, in some specific exemplary embodiments, as shown in FIGS. 3, 4, and 9A, the corner side plate portion 2011 is provided with a first connection hole 501 at one end, butted with the first middle side plate sub-portion, of the corner side plate portion 2011; the first middle side plate sub-portion is provided with a second connection hole 502 and a third connection hole 503 at one end, butted with the corner side plate portion 2011, the first middle side plate sub-portion.

The frame corner part 130 is provided with a fourth connection hole 504 and a fifth connection hole 505 at one end, butted with the first frame straight-edge part 110, of the frame corner part 130; and the first frame straight-edge part 110 is provided with a sixth connection hole 506 at one end, butted with frame corner part 130, of the first frame straight-edge part 110. A first bolt 601 is inserted into the first connection hole 501 and the fourth connection hole 504, and a second bolt 602 is inserted into the second connection hole 502 and the fifth connection hole 505. A third bolt 603 is inserted into the third connection hole 503 and the sixth connection hole 506.

Figure 9B:
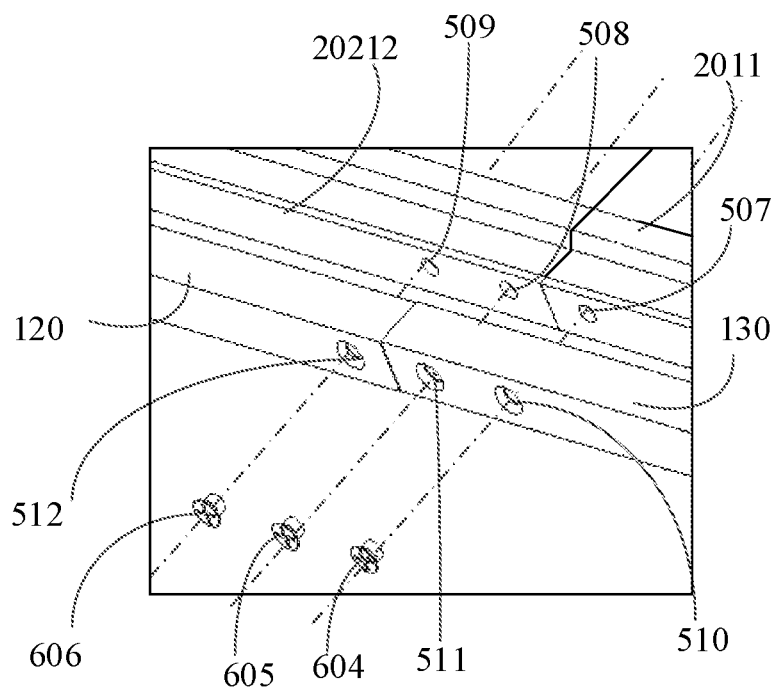
Figure 10:
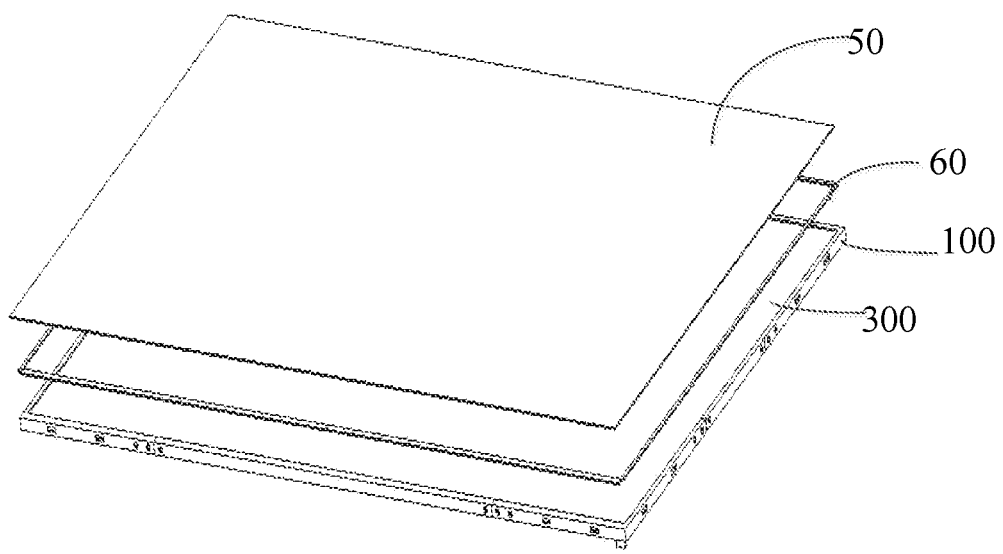
FIG. 10 is a schematic structural diagram of a display device provided by the present disclosure.

In some specific exemplary embodiments, as shown in FIGS. 3, 4, and 9B, the corner side plate portion 2011 is provided with a seventh connection hole 507 at one end, butted with the second middle side plate sub-portion 20212, of the corner side plate portion 2011; the second middle side plate sub-portion 20212 is provided with an eighth connection hole 508 and a ninth connection hole 509 at one end, butted with the corner side plate portion 2011, of the second middle side plate sub-portion 20212. The frame corner part 130 is provided with a tenth connection hole 510 and an eleventh connection hole 511 at one end, butted with the second frame straight-edge part 120, of the frame corner part 130; and the second frame straight-edge part 120 is provided with a twelfth connection hole 512 at one end, butted with the frame corner part 130, of the second frame straight-edge part 120. A fourth bolt 604 is inserted into the seventh connection hole 507 and the tenth connection hole 510, a fifth bolt 605 is inserted into the eighth connection hole 508 and the eleventh connection hole 511, and a sixth bolt 606 is inserted into the ninth connection hole 509 and the twelfth connection hole 512, so as to ensure the strength of the frame 100 and the strength of the backplate 200 at the butting positions.

Of course, it can be understood that, in practical application, connections between the frame 100 and the backplate 200 are not limited to the above connection described above.

In addition, in the exemplary embodiments of the present disclosure, in each of the cross-rod linkage mechanisms, two opposite ends of one of the scalable connection rods 221 are respectively rotatably connected to corner bottom plate portions 2012 of a pair of diagonally positioned corner backplates 201 among the four corner backplates 201; two opposite ends of the other of the scalable connection rods 221 are respectively rotatably connected to the corner bottom plate portions 2012 of the other pair of diagonally positioned corner backplates 201 among the four corner backplates 201.

In the above embodiment, each of the corner backplates 201 has a corner bottom plate portion 2012, and a scalable connection rod 221 is connected to the corner bottom plate portion 2012, to enable connection between the cross-rod linkage mechanism and the backplate body 210.

In addition, in some embodiments of the present disclosure, the adjustable bracket 220 includes at least two cross-rod linkage mechanism, wherein the scalable connection rods 221, connected to the same pair of diagonally positioned corner backplates, of two cross-rod linkage mechanisms are disposed in parallel. In the above technical solution, connection within the backplate 200 is made more stable by provide the at least two cross-rod linkage mechanisms, and the number of the cross-rod linkage mechanisms can be appropriately increased.

Taking some of the exemplary embodiments shown in FIG. 1 as an example, four corner backplates 201 include a first corner backplate 201a, a second corner backplate 201b, a third corner backplate 201c, and a fourth corner backplate 201d, wherein the first corner backplate 201a and the third corner backplate 201c are diagonally positioned, and the second corner backplate 201b and the fourth corner backplate 201d are diagonally positioned. Each of the corner bottom plate portions includes a first plate sub-portion 2012a and a second plate sub-portion 2012b disposed at an included angle; the first plate sub-portion 2012a is connected to the first portion 131 of the frame corner part 130, the second plate sub-portion 2012b is connected to the second portion 132 of the frame corner part 130.

As shown in FIG. 4, a first connection post 702a is provided on the first plate sub-portion 2012a, and a second connection post 720b is provided on the second plate sub-portion 2012b.

The at least two cross-rod linkage mechanisms include a first cross-rod linkage mechanism 220a and a second cross-rod linkage mechanism 220b. The two scalable connection rods 221 of the first cross-rod linkage mechanism 220a include a first scalable connection rod 221a1 and a second scalable connection rod 221a2; the two scalable connection rods 221 of the second cross-rod linkage mechanism 220b include a first scalable connection rod 221b1 and a second scalable connection rod 221b2. The first scalable connection rod 221a1 of the first cross-rod linkage mechanism 220a is parallel to the first scalable connection rod 221b1 of the second cross-rod linkage mechanism 220b. One end of the first scalable connection rod 221a1 of the first cross-rod linkage mechanism 220a is connected to a first plate sub-portion 2012a of the corner bottom plate portion 2012 of the first corner backplate 201a through a first connection post 702a, and the other end of the first scalable connection rod 221a1 of the first cross-rod linkage mechanism 220a is connected to a second plate sub-portion 2012b of the corner bottom plate portion 2012 of the third corner backplate 201c through a second connection post 702b. One end of a first scalable connection rod 221b of the second cross-rod linkage mechanism 220b is connected to a second plate sub-portion 2012b of the corner bottom plate portion 2012 of the first corner backplate 201a through a second connection post 702b, and the other end of the first scalable connection rod 221b of the second cross-rod linkage mechanism 220b is connected to a first plate sub-portion 2012a of the corner bottom plate portion 2012 of the third corner backplate 201c through a first connection post 702a. The second scalable connection rod 221a2 of the first cross-rod linkage mechanism 220a is parallel to the second scalable connection rod 221b2 of the second cross-rod linkage mechanism 220b. One end of the second scalable connection rod 221a2 of the first cross-rod linkage mechanism 220a is connected to a first plate sub-portion 2012a of the corner bottom plate portion 2012 of the second corner backplate 201b through a first connection post 702a, and the other end of the second scalable connection rod 221a2 of the first cross-rod linkage mechanism 220a is connected to the second plate sub-portion 2012b of the corner bottom plate portion 2012 of the fourth corner backplate 201d through a second connection post 702b. One end of a second scalable connection rod 221b2 of the second cross-rod linkage mechanism 220b is connected to a second plate sub-portion 2012b of the corner bottom plate portion 2012 of the second corner backplate 201b through a second connection post 702b, and the other end of a second scalable connection rod 221b2 of the second cross-rod linkage mechanism 220b is connected to the first plate sub-portion 2012a of the corner bottom plate portion 2012 of the fourth corner backplate 201d through a first connection post 702a.

In the above technical solution, the adjustable bracket 220 includes two cross-rod linkage mechanisms. By arranging the corner bottom plate portion 2012 of each corner backplate 201 as a first plate sub-portion 2012a and a second plate sub-portion 212b arranged at an included angle (e.g., an angle of 90 degrees), and by connecting the first plate sub-portion 2012a and the second plate sub-portions 2012b, of the same corner backplate 201 to the scalable connection rods 221 of different cross-rod linkage mechanisms via the first connection post 702a and the second connection post 702b, respectively, the scalable connection rods 221a1 and 221b1 of the two cross-rod linkage mechanisms 220a and 220b are arranged in parallel and the scalable connection rods 221a2 and 222b2 of the two cross-rod linkage mechanisms 220a and 220b are arranged in parallel, so that the purpose of synchronous adjustment of the two cross-rod linkage mechanisms can be achieved when the cross-rod linkage mechanisms are adjusted.

Of course, it can be understood that the above embodiments are only some embodiments of the present disclosure, and in practical application, when the number of the cross-rod linkage mechanisms is more than one, the structure of the cross-rod linkage mechanisms is not limited to the above structure, and will not be repeated here.

In addition, in some exemplary embodiments of the present disclosure, the cross-rod linkage mechanism is further provided with a pre-locking structure at a pivot where at least two scalable connection rods 221 are pivotally connected. The pre-locking structure is used for defining an angle of relative rotation between at least two scalable connection rods 221.

In the embodiment disclosed above, the pre-locking structure is provided at the pivot where the scalable connection rods 221 of each cross-rod linkage mechanism are pivotally connected, so that when adjusting the size of the frame 100 for the backplate 200 by replacing the first frame straight-edge part 110 having a different length and the second frame straight-edge part 120 having a different length, the frame corner part 130 and the cross-rod linkage mechanisms may be provided first before the first frame straight-edge part 110 and the second frame straight-edge part 120 are not fitted, and then the angle of relative rotation between at least two scalable connection rods 221 in the cross-rod linkage mechanisms are fixed by the pre-locking structure. In this way, assembly of the first frame straight-edge part 110 and the second frame straight-edge part 120 is easier.

The pre-locking structure may be implemented in the following manner. For example, the at least two scalable connection rods 221 of each cross-rod linkage mechanism are connected in the middle by a rotating shaft 2215. The rotating shaft 2215 may be a bolt. After the bolt passes through the pivot hole 2214 in the middle of each of the scalable connection rods 221, an end portion of the bolt is fastened by a nut, and the purpose of pre-locking is achieved through cooperation between the nut and the bolt.

Of course, it can be understood that the above embodiments are only some embodiments, and in practical application, a specific structure of the pre-locking structure can be various, which is not listed here.

In addition, in some exemplary embodiments provided by the present disclosure, each of the scalable connection rods 221 is further provided with a length retaining structure for retain a scalable degree (i.e. a length) of the scalable connection rod 221.

According to the above-mentioned scheme, the scalable degree of each of the scalable connection rods 221 can be retained, that is, when the length of each scalable connection rod 221 reaches a certain length, the length can be fixed. Specifically, the length retaining structure may be implemented in various ways. For example, one or more resilient buttons are arranged on the middle rod 2211, and at least one row of holes is arranged sequentially in the lengthwise direction of the scalable connection rod 221 at end portions, for connecting the middle rod 2211, of the first end rod 2212 and the second end rod 2213. The resilient button may spring into a corresponding hole, such that relative positions between the first end rod 2212 and the middle rod 2211 and between the second end rod 2213 and the middle rod 2211 are retained.

Figure 11:
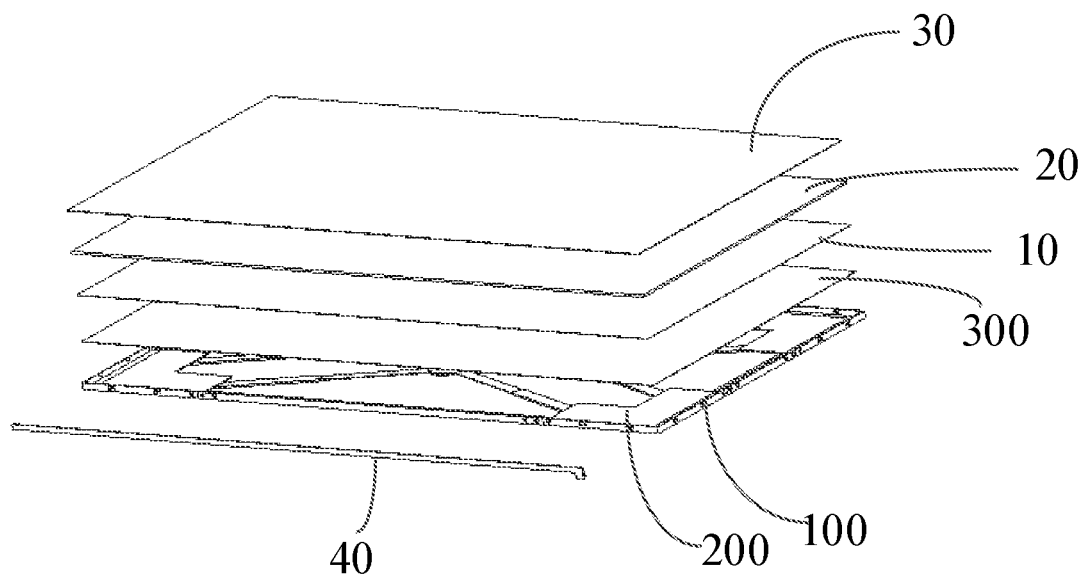
FIG. 11 is a schematic structural diagram showing another viewing angle of the display device provided by the present disclosure.
Figure 12:
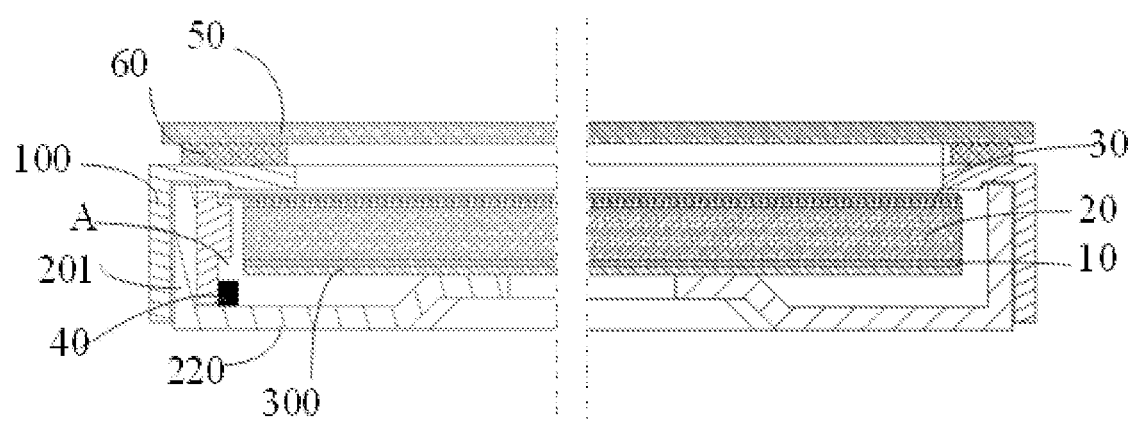
FIG. 12 is a schematic structure diagram of a section of a display device provided by the present disclosure.

In some exemplary embodiments, as shown in FIGS. 4, 11 and 12, a hollow cavity A for accommodating a light bar 40 is provided inside at least one side edge of the frame 100. In addition, an open 101 for a lead terminal of the light rod is arranged at the side edge.

In addition, in some exemplary embodiments, as shown in FIG. 11, the frame-backplate assembly further includes a thin baseplate 300 supported by the adjustable bracket and stacked on the backplate body 210.

In the above embodiment, the thin baseplate 300 is arranged on the backplate body 210, and the thin baseplate 300 can be a thin steel plate. A light guide plate and an optical film of a backlight module are disposed on the thin baseplate 300, under a condition that the frame-backplate assembly is assembly with the backlight module. Since the structure of the backplate includes the backplate body 210 and the adjustable bracket 220, if components such as the light guide plate and the optical film are directly placed on the backplate body 200, a defect of stress mark may be generated. If the thin baseplate 300 is placed on the backplate body 220, a function of flattening a surface may be achieved, so that occurrence of the defect of stress mark can be reduced. In addition, a thickness of the thin backplate 300 may be about 0.3 mm. This thin steel plate has a certain rigidity, and may play a support function.

In addition, in some exemplary embodiments, as shown in FIG. 3, a backplate hook (HOOK) structure 701 is further provided on an outer peripheral surface of the frame 100.

A backlight module is also provided in an embodiment of the present disclosure. The backlight module includes a backplate 200 provided in the embodiments of the present disclosure.

As shown in FIG. 11 and FIG. 12, in an exemplary embodiment, the backlight module further includes: a reflective sheet 10 arranged in the frame 100 and located at a side, away from the adjustable bracket 220, of the thin baseplate 300; a light guide plate 20 arranged at a side, away from the thin baseplate 300, of the reflective sheet 10; an optical film 30 arranged on a side, away from the thin baseplate 300, of the light guide plate 20; and a light bar 40 arranged in the hollow cavity A at one side edge of the backplate 200.

In addition, the embodiments of the present disclosure also provide a display device. The display device includes the backlight module provided by the embodiments of the present disclosure.

As shown in FIG. 12, in an exemplary embodiment, the display device further includes a display panel 50, wherein the frame 100 supports the display panel 50, a buffer layer 60 is arranged between the frame 100 and the display panel 50. The buffer layer 60 may be a buffer foam layer.

The display device may be any product or component with a display function such as a liquid crystal television, a liquid crystal display, a digital photo frame, a mobile phone and a tablet computer, wherein, the display device further includes a flexible circuit board, a printed circuit board and a backplate.

The beneficial effects brought by the embodiments of the present disclosure are as follows.

In the frame-backplate assembly, the backlight module and the display device provide by the embodiments of the present disclosure, the length of each side edge of the frame can be adjusted. In this way, the size of the frame may be adjusted, and the frame may be applied, as a general-purpose frame, in display modules of various sizes. In addition, the backplate and the frame can be detachably connected, and the backplate can be dismounted and be replaced by a backplate with a different size. In this way, the frame-backplate assembly can be applied to modules of different sizes. In particular, the cost of mold-making for modules with a fewer batch can be reduced significantly, and the frame-backplate assembly can also be used in development and testing in an early stage, thereby reducing a mold-making cycle, shortening an overall project schedule.

The following points need to be explained.

(a) The drawings of the embodiments of the present disclosure relate only to structures related to the embodiments of the present disclosure, and other structures in the embodiments of the present disclosure can be obtained by referring to a general design.

(b) for sake of clarity, in the drawings used to describe the embodiments of the present disclosure, thicknesses of layers or regions are enlarged or reduced, i.e., these drawings are not drawn to an actual scale. It will be appreciated that when an element such as a layer, a film, a region or a substrate is referred to as being "on" or "under" another element, the element may be "directly on" or "directly under" another element or intervening elements may be present.

(c) the embodiments of the present disclosure and the features in the embodiments may be combined with each other to obtain a new embodiment without conflict.

The above are only specific embodiments of the present disclosure, but the protection scope of the present disclosure is not limited thereto, and the protection scope of the present disclosure should be consistent with that of the claims.

What is claimed is:

1. A frame-backplate assembly, comprising:
a frame, comprising four side edges connected end to end in turn and enclosing a hollow frame structure, wherein each of the four side edges is adjustable in length; and
a backplate located inside the hollow frame structure enclosed by the frame, wherein four side edges of the backplate are detachably connected with four sides in the frame
wherein, the frame comprises:
two first frame straight-edge parts opposite to each other;
two second frame straight-edge parts opposite to each other; and
four frame corner parts, each of the frame corner parts comprising a first portion and a second portion disposed at an included angle;
wherein each frame corner part of the four frame corner parts is connected to one first frame straight-edge part and one second frame straight-edge part adjacent to the one first frame straight-edge part, and the first portion of the frame corner part is butted with the one first frame straight-edge part, and the second portion of the frame corner part is butted with the one second frame straight-edge part, the four side edges of the frame are composed of the four frame corner parts, two first frame straight-edge part, and two second frame straight-edge parts,
wherein, the backplate comprises:
a backplate body inside the hollow frame structure enclosed by the frame and having four side edges, wherein the four side edges of the backplate body are detachably connected with the four side edges of the frame; and
an adjustable bracket detachably connected with the backplate body, wherein a length of projection, on each of the four side edges of the frame, of the adjustable bracket is adjustable.

2. The frame-backplate assembly according to claim 1, wherein,
the first frame straight-edge part is detachably or slideably connected with the first portion; and/or
the second frame straight-edge part is detachably connected or slideably connected with the second portion.

3. The frame-backplate assembly according to claim 1, wherein, the adjustable bracket comprises one or more cross-rod linkage mechanisms, each of the one or more cross-rod linkage mechanisms comprises at least two scalable connection rods, middle portions of the at least two scalable connection rods are rotatably pivoted together, each scalable connection rod of the at least two scalable connection rods is extendable and retractable so as to adjust a length of the scalable connection rod;
two opposite ends of one scalable connection rod of the at least two scalable connection rods are rotatably connected with a pair of diagonally positioned corners of the backplate body, respectively;
two opposite ends of another scalable connection rod of the at least two scalable connection rods are rotatably connected with another pair of diagonally positioned corners of the backplate body, respectively.

4. The frame-backplate assembly according to claim 3, wherein, each scalable connection rod of the at least two scalable connection rods comprises:
a middle rod, comprising a first end and a second end opposite to the first end, a middle portion of the middle rod being provided with a pivot hole;
a first end rod, wherein a first end of the first end rod is slideably connected with the first end of the middle rod and is slideable relative to the middle rod, a second end of the first end rod is rotatably connected with one corner of a pair of diagonally positioned corners of the backplate body; and
a second end rod, wherein a first end of the second end rod is slideably connected with the second end of the middle rod and is slideable relative to the middle rod, a second end of the second end rod is connected with other corner of the pair of diagonally positioned corners of the backplate body;
wherein, the at least two scalable connection rods in each of the one or more cross-rod linkage mechanisms are pivotally connected by a rotating shaft inserted in a pivot hole on the middle rod of each scalable connection rod of the at least two scalable connection rods.

5. The frame-backplate assembly according to claim 4, wherein,
the middle rod is a rod-shaped structure;
each of the first end rod and the second end rod is a hollow sectional bar structure with a hollow cavity;
a first end of the middle rod is inserted into the hollow cavity of the first end rod and is slideable within the hollow cavity;
a second end of the middle rod is inserted into the hollow cavity of the second end rod and is slideable within the hollow cavity.

6. The frame-backplate assembly according to claim 4, wherein,
each scalable connection rod of the at least two scalable connection rods is further provided with a length retaining structure for retain a scalable degree of the scalable connection rod.

7. The frame-backplate assembly according to claim 6, wherein, the length retaining structure comprises:
one or more resilient buttons arranged on the middle rod; and
at least one row of holes arranged sequentially in a lengthwise direction of the scalable connection rod at end portions, for connecting the middle rod, of the first end rod and the second end rod;
wherein the resilient button is configured to spring into a corresponding hole of the at least one row of holes, such that relative positions between the first end rod and the middle rod and between the second end rod and the middle rod are retained.

8. The frame-backplate assembly according to claim 3, further comprising:
a thin baseplate supported by the adjustable bracket and stacked on the backplate body.

9. A backlight module, comprising:
the frame-backplate assembly according to claim 8;
a reflective sheet in the frame and at a side, away from the adjustable bracket, of the thin baseplate;
a light guide plate at a side, away from the thin baseplate, of the reflective sheet;
an optical film on a side, away from the thin baseplate, of the light guide plate; and
a light bar,
wherein, a hollow cavity for accommodating the light bar is provided inside at least one side edge of the frame, and the light bar is in the hollow cavity.

10. A display device, comprising:
the backlight module according to claim 9;
a display panel, wherein the frame supports the display panel; and
a buffer layer between the frame and the display panel.

11. The frame-backplate assembly according to claim 3, wherein, the backplate body comprises:
four corner backplates at four corner locations of the backplate body, each of the four corner backplates comprising a corner side plate portion and a corner bottom plate portion.

12. The frame-backplate assembly according to claim 11, wherein,
the backplate body further comprises a middle backplate arranged among the four corner backplates, wherein the middle backplate comprises a middle side plate portion and a middle bottom plate portion,
the middle side plate portion comprises a first middle side plate sub-portion corresponding to the first frame straight-edge part, and a second middle side plate sub-portion corresponding to the second frame straight-edge part,
a butting position between the corner side plate portion and the first middle side plate sub-portion, and a butting position between a corresponding frame corner part and a corresponding first frame straight-edge part are staggered;
a butting position between the corner side plate portion and the second middle side plate sub-portion, and a butting position between a corresponding frame corner part and a corresponding second frame straight-edge part are staggered.

13. The frame-backplate assembly according to claim 12, wherein,
the corner side plate portion is provided with a first connection hole at one end, butted with the first middle side plate sub-portion, of the corner side plate portion;
the first middle side plate sub-portion is provided with a second connection hole and a third connection hole at one end, butted with the corner side plate portion, the first middle side plate sub-portion;
the frame corner part is provided with a fourth connection hole and a fifth connection hole at one end, butted with the first frame straight-edge part, of the frame corner part;
the first frame straight-edge part is provided with a sixth connection hole at one end, butted with frame corner part, of the first frame straight-edge part;
a first bolt is inserted into the first connection hole and the fourth connection hole, a second bolt is inserted into the second connection hole and the fifth connection hole, a third bolt is inserted into the third connection hole and the sixth connection hole;
the corner side plate portion is provided with a seventh connection hole at one end, butted with the second middle side plate sub-portion, of the corner side plate portion;
the second middle side plate sub-portion is provided with an eighth connection hole and a ninth connection hole at one end, butted with the corner side plate portion, of the second middle side plate sub-portion;
the frame corner part is provided with a tenth connection hole and an eleventh connection hole at one end, butted with the second frame straight-edge part, of the frame corner part;
the second frame straight-edge part is provided with a twelfth connection hole at one end, butted with the frame corner part, of the second frame straight-edge part;
a fourth bolt is inserted into the seventh connection hole and the tenth connection hole, a fifth bolt is inserted into the eighth connection hole and the eleventh connection hole, and a sixth bolt is inserted into the ninth connection hole and the twelfth connection hole.

14. The frame-backplate assembly according to claim 11, wherein,
two opposite ends of one scalable connection rod of the at least two scalable connection rods are respectively rotatably connected with corner bottom plate portions of a pair of diagonally positioned corner backplates among the four corner backplates;
two opposite ends of another scalable connection rod of the at least two scalable connection rods are respectively rotatably connected with corner bottom plate portions of another pair of diagonally positioned corner backplates among the four corner backplates.

15. The frame-backplate assembly according to claim 14, wherein,
the adjustable bracket comprises at least two cross-rod linkage mechanisms;
two scalable connection rods, connected to a same pair of diagonally positioned corner backplates among the four frame corner parts, of two cross-rod linkage mechanisms are arranged in parallel.

16. The frame-backplate assembly according to claim 15, wherein,
the four corner backplates comprise a first corner backplate and a second corner backplate, a third corner backplate, and a fourth corner backplate, wherein the first corner backplate and the third corner backplate are diagonally positioned, and the second corner backplate and the fourth corner backplate are diagonally positioned;
each of the corner bottom plate portions comprises a first plate sub-portion and a second plate sub-portion disposed at an included angle; the first plate sub-portion is connected with the first portion of the frame corner part, the second plate sub-portion is connected with the second portion of the frame corner part;
the at least two cross-rod linkage mechanisms comprise a first cross-rod linkage mechanism and a second cross-rod linkage mechanism;
the two scalable connection rods of each of the first cross-rod linkage mechanism and the second cross-rod linkage mechanism comprise a first scalable connection rod and a second scalable connection rod;
the first scalable connection rod of the first cross-rod linkage mechanism is parallel to the first scalable connection rod of the second cross-rod linkage mechanism; a first end of the first scalable connection rod of the first cross-rod linkage mechanism is connected with the first plate sub-portion of the corner bottom plate portion of the first corner backplate, and a second end of the first scalable connection rod of the first cross-rod linkage mechanism is connected with the second plate sub-portion of the corner bottom plate portion of the third corner backplate;
a first end of the first scalable connection rod of the second cross-rod linkage mechanism is connected with the second plate sub-portion of the corner bottom plate portion of the first corner backplate, and a second end of the first scalable connection rod of the second cross-rod linkage mechanism is connected with the first plate sub-portion of the corner bottom plate portion of the third corner backplate;

the second scalable connection rod of the first cross-rod linkage mechanism is parallel to the second scalable connection rod of the second cross-rod linkage mechanism; a first end of the second scalable connection rod of the first cross-rod linkage mechanism is connected with the first plate sub-portion of the corner bottom plate portion of the second corner backplate, and a second end of the second scalable connection rod of the first cross-rod linkage mechanism is connected with the second plate sub-portion of the corner bottom plate portion of the fourth corner backplate; a first end of the second scalable connection rod of the second cross-rod linkage mechanism is connected with the second plate sub-portion of the corner bottom plate portion of the second corner backplate, and a second end of the second scalable connection rod of the second cross-rod linkage mechanism is connected with the first plate sub-portion of the corner bottom plate portion of the fourth corner backplate.

17. The frame-backplate assembly according to claim 3, wherein, each of the one or more cross-rod linkage mechanisms is further provided with a pre-locking structure at a pivot where the at least two scalable connection rods are pivotally connected; the pre-locking structure is used for defining an angle of relative rotation between the at least two scalable connection rods.

18. The frame-backplate assembly according to claim 1, wherein, a hollow cavity for accommodating a light bar is provided inside at least one side edge of the frame, and an open for a lead terminal of the light feel-bar is arranged at the side edge.

* * * * *